(12) United States Patent
De Silva et al.

(10) Patent No.: US 7,991,545 B2
(45) Date of Patent: Aug. 2, 2011

(54) METHOD AND APPARATUS FOR SELECTING POI BY BRAND ICON

(75) Inventors: Andrew De Silva, Torrance, CA (US); Mike Iao, Torrance, CA (US); Kenny Chen, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 1237 days.

(21) Appl. No.: 11/644,219

(22) Filed: Dec. 22, 2006

(65) Prior Publication Data

US 2008/0154488 A1    Jun. 26, 2008

(51) Int. Cl.
*G01C 21/00* (2006.01)
(52) U.S. Cl. ........ 701/201; 701/204; 701/208; 701/209; 701/210; 701/211
(58) Field of Classification Search .......................... None
See application file for complete search history.

(56) References Cited

U.S. PATENT DOCUMENTS

| | | | | |
|---|---|---|---|---|
| 6,128,571 A * | 10/2000 | Ito et al. | ........................ | 701/201 |
| 7,100,190 B2 * | 8/2006 | Johnson et al. | ............... | 725/105 |
| 7,490,004 B2 * | 2/2009 | Kimura | ........................ | 701/201 |
| 7,711,478 B2 * | 5/2010 | Gluck | ........................ | 701/208 |
| 2005/0085999 A1 * | 4/2005 | Onishi | ........................ | 701/211 |
| 2005/0107949 A1 * | 5/2005 | Yokota | ........................ | 701/209 |
| 2005/0137788 A1 * | 6/2005 | Kimura | ........................ | 701/201 |
| 2005/0165543 A1 * | 7/2005 | Yokota | ........................ | 701/204 |
| 2006/0206454 A1 * | 9/2006 | Forstall et al. | ................... | 707/3 |

FOREIGN PATENT DOCUMENTS

JP    2005-221245    8/2005

* cited by examiner

*Primary Examiner* — Khoi Tran
*Assistant Examiner* — Jonathan L Sample
(74) *Attorney, Agent, or Firm* — Muramatsu & Associates

(57) ABSTRACT

A method and apparatus for selecting a desired point of interest ("POI") for a navigation system displays matching brand icons associated with POIs to assist the user in finding an intended POI. When the user inputs characters indicating a POI name or a POI type, or selecting a POI type from a list, the navigation system displays brand icons of the POI name or POI type. When the user selects one of the brand icons, the navigation system lists the POIs associated with the brand icons in the predetermined order such as distance from the current vehicle position. Since the number of brand icons are limited, and each brand icon has a readily recognizable image, the user can quickly find a desired POI by selecting a brand icon.

20 Claims, 12 Drawing Sheets

Fig. 1A
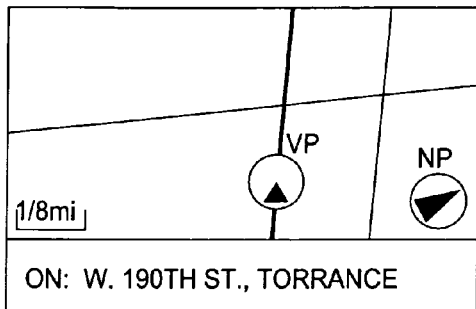
Fig. 1B
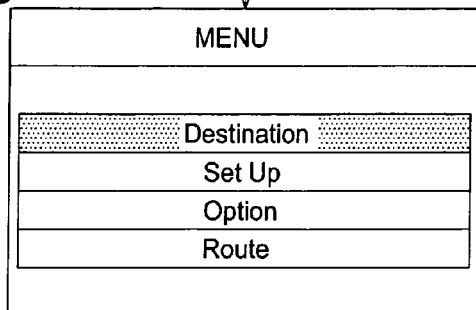
Fig. 1C
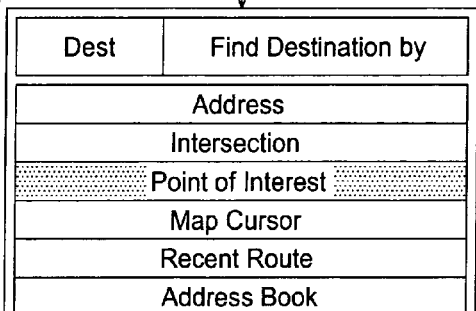
Fig. 1D
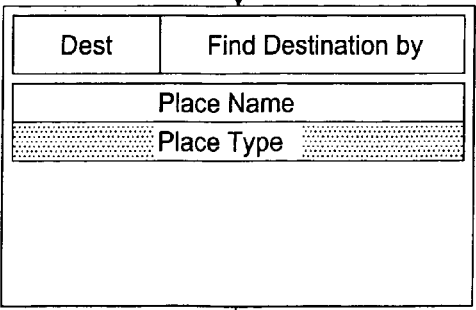
Fig. 1E
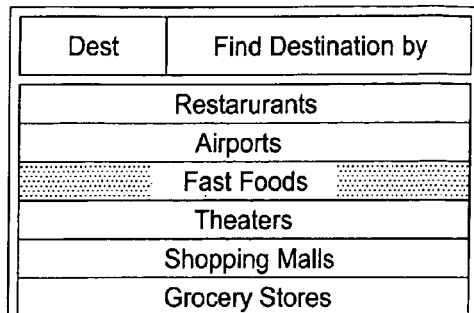
Fig. 1F
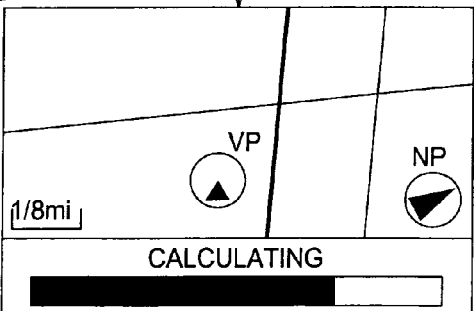
Fig. 1G
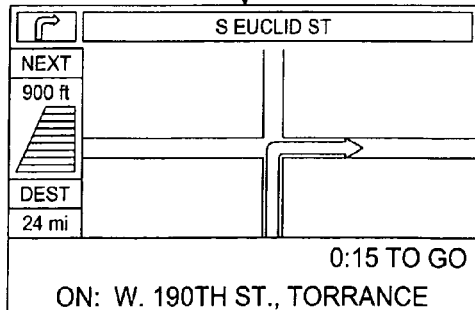
Fig. 1H

Fig. 8

| # of Inputs | Max Brand Icons Available | Average Brand Icons Available |
|---|---|---|
| 1 | 30 | 10.52 |
| 2 | 7 | 2.10 |
| 3 | 3 | 1.23 |
| 4 | 3 | 1.09 |
| 5 | 3 | 1.07 |
| 6 | 2 | 1.03 |

Fig. 9

| Place Names with Brand Icons | Number of inputs by conventional system | Number of inputs by new system |
|---|---|---|
| Bass Pro Shops | 11 | 1 |
| Chili's Grill & Bar | 9 | 2 |
| Double Tree (Hilton) | 13 | 2 |
| Haagen-Dazs | 10 | 1 |
| Krisply Kreme | 11 | 1 |
| Nordstrom's | 9 | 1 |
| Popeye Chicken | 9 | 2 |
| Shell | 6 | 2 |
| TGI Friday's | 7 | 2 |
| White Hen Pantry | 9 | 2 |
| Average | 9.4 | 1.6 |

US 7,991,545 B2

METHOD AND APPARATUS FOR SELECTING POI BY BRAND ICON

FIELD OF THE INVENTION

This invention relates generally to a method and apparatus for finding a point of interest for a navigation system in response to user's inputs, and more particularly, to a method and apparatus for quickly finding a point of interest or other desired places by displaying brand icons in response to user's inputs where a brand icon representing an intended location can be selected at an early stage of selecting a destination for a navigation system.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the current position, and reads out map data pertaining to an area at the current position from a data storage medium such as a DVD. Typically, the navigation system displays a map image on a monitor screen while superimposing thereon a mark representing the current location of the user. At an intersection, the navigation system notifies the user which direction to turn at the intersection.

FIGS. 1A-1H show examples of overall procedure and screen display involved in the navigation system for a travel to a destination. FIG. 1A shows an example of locator map screen of the navigation system when the destination is not specified. Typically, the navigation system displays a street on which the vehicle (vehicle position VP) is running on a map image and a name of the street. Other information such as a north pointer NP, a map scale and a current time may also be illustrated on the display screen.

An example of process for specifying a destination in the navigation system through a Point of Interest (POI) search method is shown in FIGS. 1B-1F. A main menu screen shown in FIG. 1B displays menu items including a "Destination" menu for selecting the destination. When selecting "Destination", the navigation system displays a "Find Destination by" screen shown in FIG. 1C for specifying an input method for selecting the destination. The "Find Destination By" screen lists methods for selecting the destination including "Address", "Intersection", and "Point of Interest (POI)".

When selecting, the "Point of Interest" method in FIG. 1C, the navigation system displays selection methods of POI either by "Place Name" or "Place Type" in FIG. 1D. The "Place Name" is to specify a name of POI, and the "Place Type" is to specify a category of POI. If the "Place Type" is selected in FIG. 1D, the navigation system lists categories of POIs as shown in FIG. 1E. The user selects a desired category of POIs from the lists.

FIG. 1F shows a screen when the user has selected a "Fast Foods" category in the example of FIG. 1E. In this example, the screen includes the name of POI type "Fast Foods" at the top and a list of names of the fast food restaurants typically sorted by distance from the current position. Because "Burger King" is the nearest location, it is listed on the top. The user selects a particular restaurant among the lists for route guidance.

In FIG. 1G, the navigation system displays a progress scale during the calculation of the route to the destination. After determining the route, the navigation system starts the route guidance as shown in FIG. 1H. Typically, the navigation system shows the intersection that is highlighted to show the next turn and a direction of the turn. The search method in the conventional navigation system works in the foregoing manner.

There arise a situation where a user who wants to search multiple POIs of the same type and name and obtain the most efficient route to accomplish the particular purpose. In the conventional navigation system, when POIs are displayed on the map image of the navigation system, generic icons are displayed. For example, generic icons representing restaurant or gas station may be superposed on the map as shown in FIG. 2. A generic icon will not differentiate individual stores but simply indicates the type of the POIs. Thus, fast food restaurants such as "McDonald", "Burger King", "Pizza Hut", etc., are represented by the same generic icon of restaurant.

Thus, in the example of FIG. 2, since all the nearby restaurants are indicated by the generic icons for restaurant, the user cannot easily distinguish which icons indicate what kind of restaurant. If the user wants to go to a particular restaurant, for example, "Pizza Hut", the user cannot tell whether "Pizza Hut" exists just by looking at the map image of FIG. 2. Moreover, the user may wish to fill gasoline at a particular gas station chain store such as "Chevron", "Arco", etc., for instance, because the user can use a reward card, or at a gas station chain store the user knows to offer competitive prices.

Accordingly, there is a need of a more efficient way of identifying particular types and names of POI to improve the operability of the navigation system.

SUMMARY OF THE INVENTION

It is, therefore, an object of the present invention to provide a more efficient way of identifying a particular type or name of POI for a navigation system with use of brand icons representing the POIs.

It is anther object of the present invention to provide a navigation system incorporating an efficient way of specifying a destination by searching and selecting a brand icon that has a readily recognizable image.

One aspect of the present invention is a method for selecting a point of interest (POI) for a navigation system by specifying a place name. The method is comprised of the steps of: inputting one or more characters indicating a place name of an intended POI for a navigation system; detecting whether place names specified by the characters input so far have brand icons; displaying the detected brand icons of the place names specified by the input characters; selecting one of the detected brand icons; displaying a list of POI names having the selected brand icon; and selecting a POI from the list of POI names.

The method further comprises a step of calculating a route to the selected POI and conducting a route guidance operation to the selected POI. The above noted step of displaying the list of POI names having the selected brand icon includes a step of listing the POI names in an order of distance from a current position to the POIs. The above noted step of displaying the list of POI names having the selected brand icon includes a step of listing the POI names in an alphabetical order of the POI names. The above noted step of detecting whether the place names specified by the characters input have brand icons includes a step of listing POI names that match the input characters without displaying brand icons if the place names do not have brand icons.

Another aspect of the present invention is a method for selecting a point of interest (POI) for a navigation system by specifying a place type. The method is comprised of the steps of: inputting one or more characters indicating a place type of an intended POI or selecting a place type of the intended POI from a list on a screen of the navigation system; detecting whether POIs of the place types specified by the user so far has brand icons; displaying the detected brand icons of POIs belonging to the specified place types; selecting a brand icon from a list of the detected brand icons; displaying a list of POIs belonging to the place type of the selected brand icon; and selecting a POI from the list of POIs.

A further aspect of the present invention is an apparatus for a navigation system for implementing the steps defined in the methods of the present invention noted above. The apparatus includes various means to examine whether the particular places specified by either place names or place types are associated with the brand icons. The navigation system displays the brand icons so that the user can select the brand icon to find the desired POI quickly and easily.

According to the present invention, when the user inputs characters indicating a POI name or a POI type, or selecting a POI type from a list, the navigation system displays brand icons of the POI name or POI type. When the user selects one of the brand icons, the navigation system lists the POIs associated with the brand icons in the predetermined order such as distance from the current position. Since the number of brand icons are limited, and each brand icon has a readily recognizable image, the user can quickly find a desired POI by selecting a brand icon.

BRIEF DESCRIPTION OF THE DRAWINGS

FIGS. 1A-1H are schematic diagrams showing examples of operational process and screen display involved in the navigation system for selecting a destination.

FIG. 8 shows a table in which the number of inputs and the maximum and average numbers of brand icons available corresponding to the number of inputs are listed based on navigation map data.

FIG. 9 shows a table in which the numbers of inputs required for attaining desired POIs are compared between the present invention and the conventional method.

DETAILED DESCRIPTION OF THE INVENTION

The method and apparatus under the present invention to quickly find a desired location by means of brand icons for a navigation system is explained with reference to the drawings. The method and apparatus of the present invention provides a more efficient way of identifying particular types or names of POI with use of brand icons representing the POIs. During the process of finding POIs or other places, the navigation system displays a list of brand icons based on the data input by the user. Since the number of brand icons are limited, and each brand icon has a readily recognizable image, the user can quickly find a desired POI by selecting a brand icon.

Figure 2:
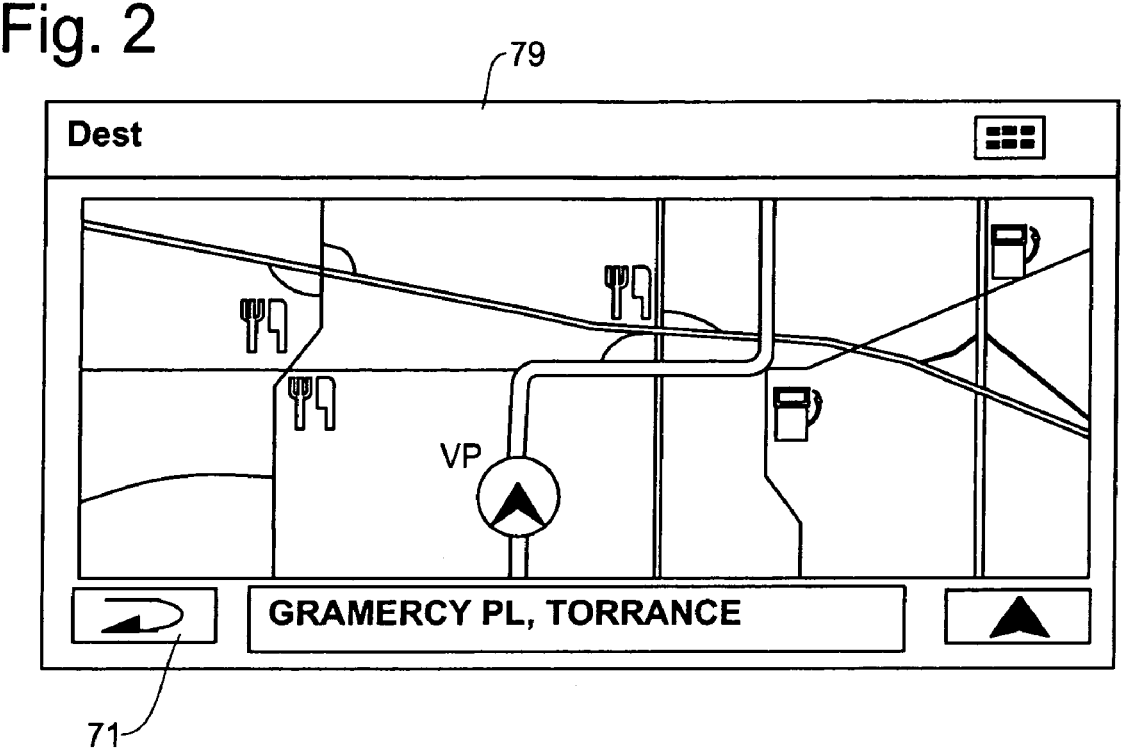
FIG. 2 is a schematic diagram showing an example of a display of a navigation system where point of interests are represented by generic icons.
Figure 3A:
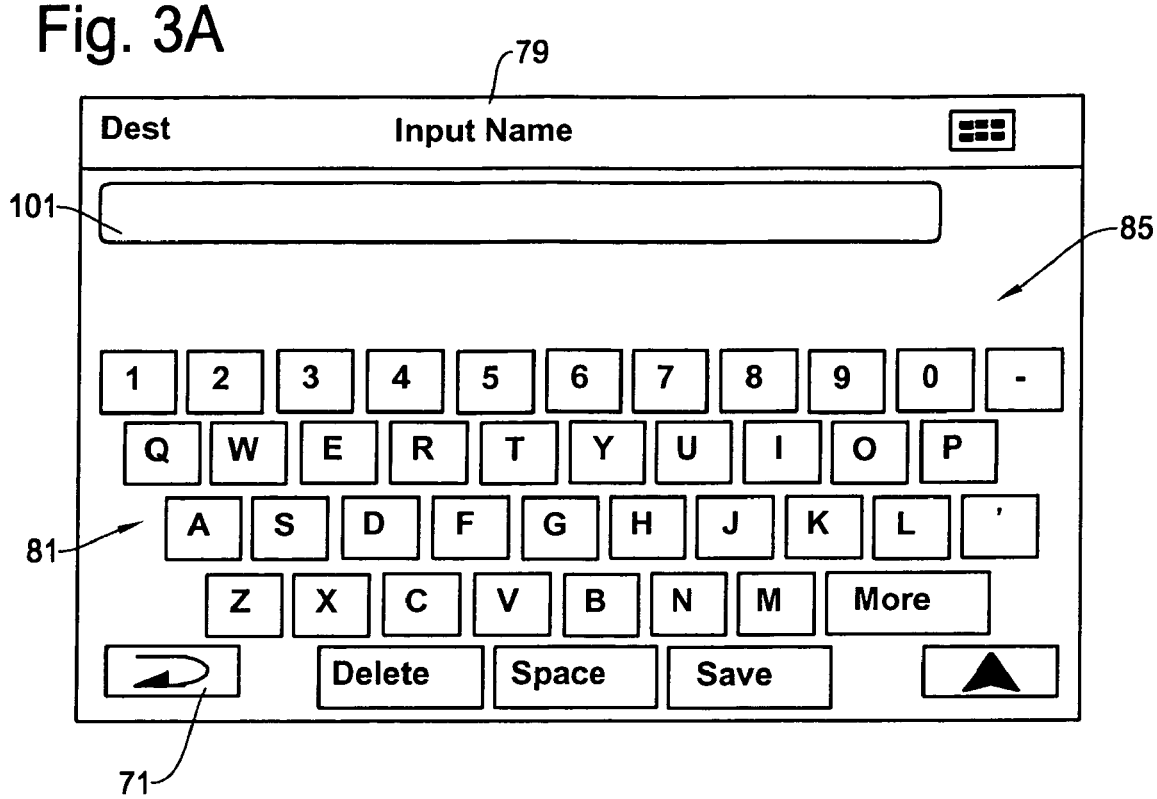
FIGS. 3A-3C are schematic diagrams showing examples of displays of a navigation system under the present invention to show steps of selecting a desired POI by displaying brand icons that are retrieved in response to the characters of POI name entered by the user.
Figure 3B:
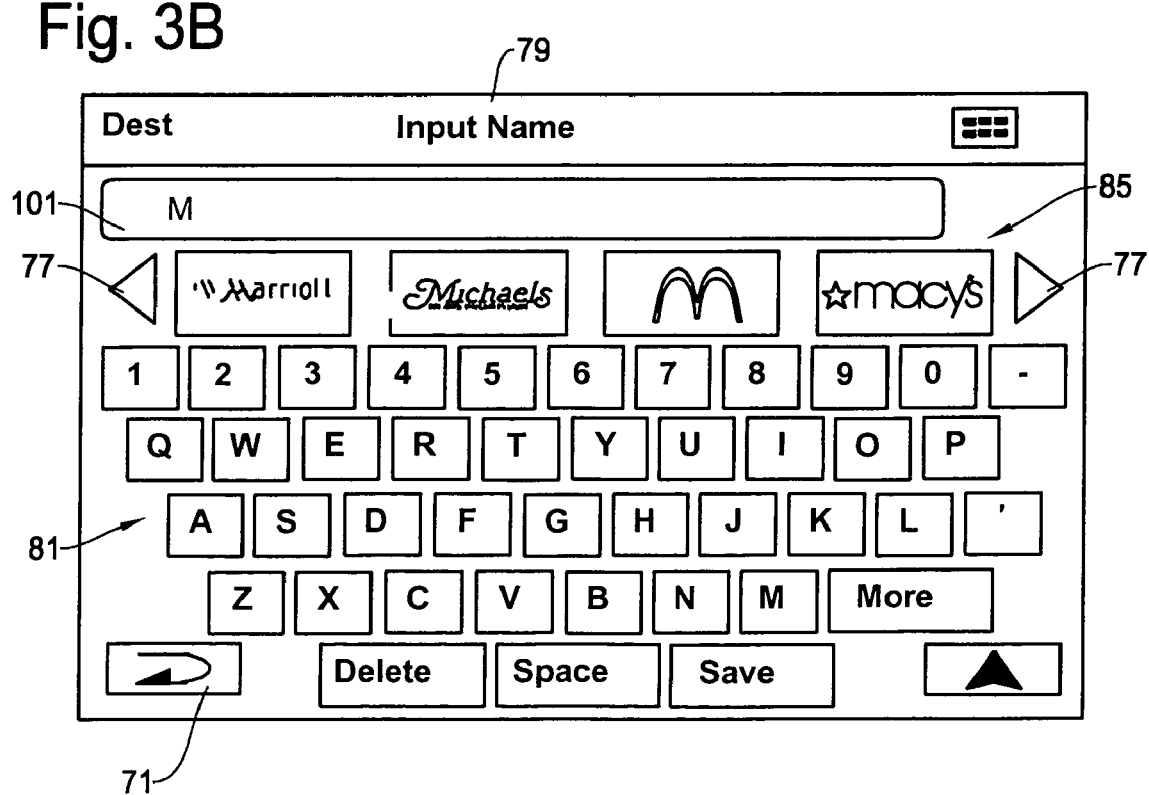
Figure 3C:
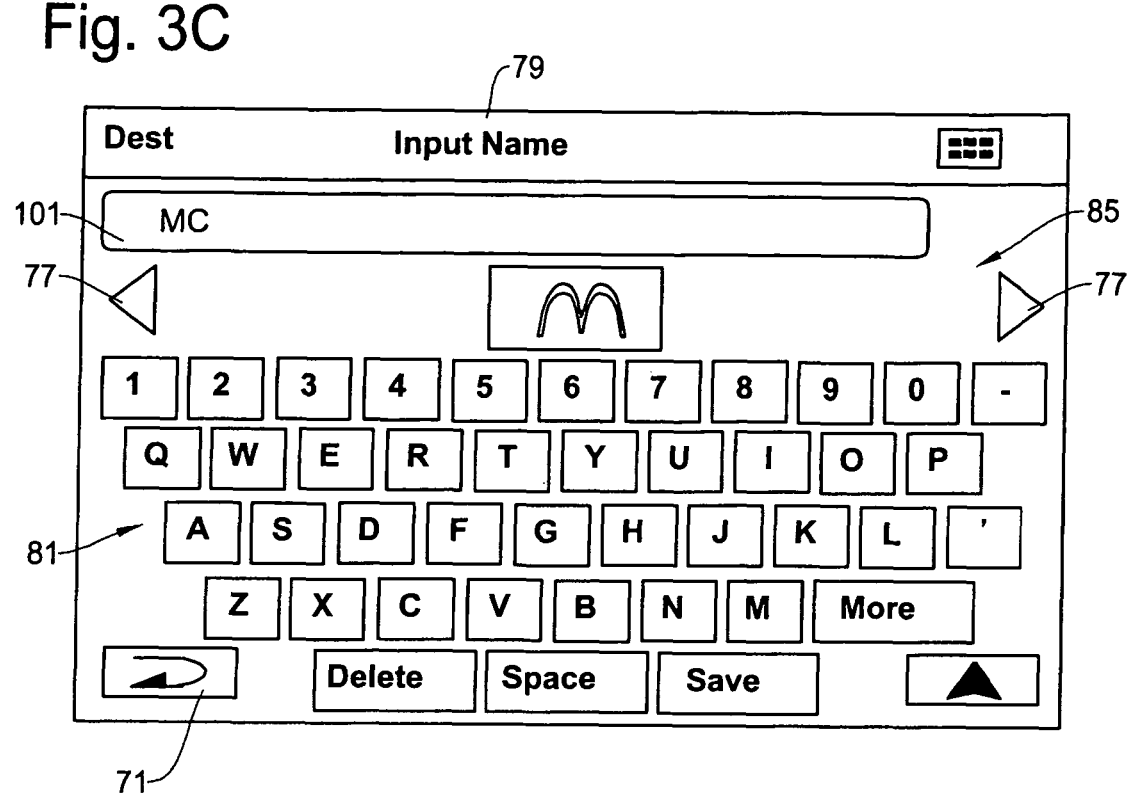

FIGS. 3A-3C are screen examples of the navigation system under the present invention showing brand icons for selecting a POI. FIG. 3A shows a screen where the user enters a name of a POI through a keyboard 81 provided on the monitor screen. By pressing any one of the keys, the user is able to input the character into an input field 101. Although the alphanumeric keyboard 81 is arranged in this example, the keyboard may be arranged in any other manner, such as an alphabetical order. The keyboard may also be arranged such that dedicated keys for numeric input and dedicated keys for alphabet input are provided separately and are switched therebetween by, for example, a toggle button to be displayed on the screen.

In this example, a brand icon area 85 where candidate brand icons will be listed is located between the input field 101 and the keyboard 81. In the example of FIG. 3A, no brand icon is shown since the user has not input any characters. Alternatively, in such a situation that no input characters are provided, it is also possible to show all of the brand icons registered in the navigation system in the brand icon area 85.

In FIG. 3B, when the user enters characters in the input field 101, the navigation system searches matching brand icons and lists the brand icons in the brand icon area 85. In the example of FIG. 3B, the user has input a character "M" to the input field 101 which is the first character of an intended place name. The navigation system displays a list of brand icons that start with the character "M". During this process, the navigation system checks the database and causes some keys on the keyboard 81 be shaded and disabled when the characters of the those keys cannot follow the user's input.

The scroll arrows 77 are provided to scroll the candidate brand icons. When the number of the candidate icons are more than that can be listed at once, the user is able to find other candidate brand icons by pressing the scroll arrows 77 to see more candidate brand icons. The scroll arrows 77 may be disabled when the number of candidate brand icons are fewer than the maximum number that can be displayed at once on the display. Alternatively, the scroll arrows 77 may be enabled all the time so that the user is able to scroll available brand icons regardless of the number of available brand icons. If desired brand icon is listed, the user is able to directly select the POI without further inputting the characters of the place name, thereby quickly specifying a destination. The return button 71 is used to return to the previous screen.

FIG. 3C is similar to the previous display examples in FIGS. 3A and 3B, but shows the display where the user has additional input "C" so that the input field 101 now has the characters "MC". In this condition, only one brand icon is shown as a candidate brand icon. The scroll arrows 77 are shaded and disabled in this example. Although the navigation system has narrowed down the candidate icons only to McDonald's in this example, a plurality of brand icons may remain as candidates even if the user has input more than two characters. In either display, the user is able to select a desired brand icon from the list. In the case where an intended POI is not associated with a brand icon, the user may proceed to select the POI by simply continuing the process of inputting the name of the POI.

Figure 3D:
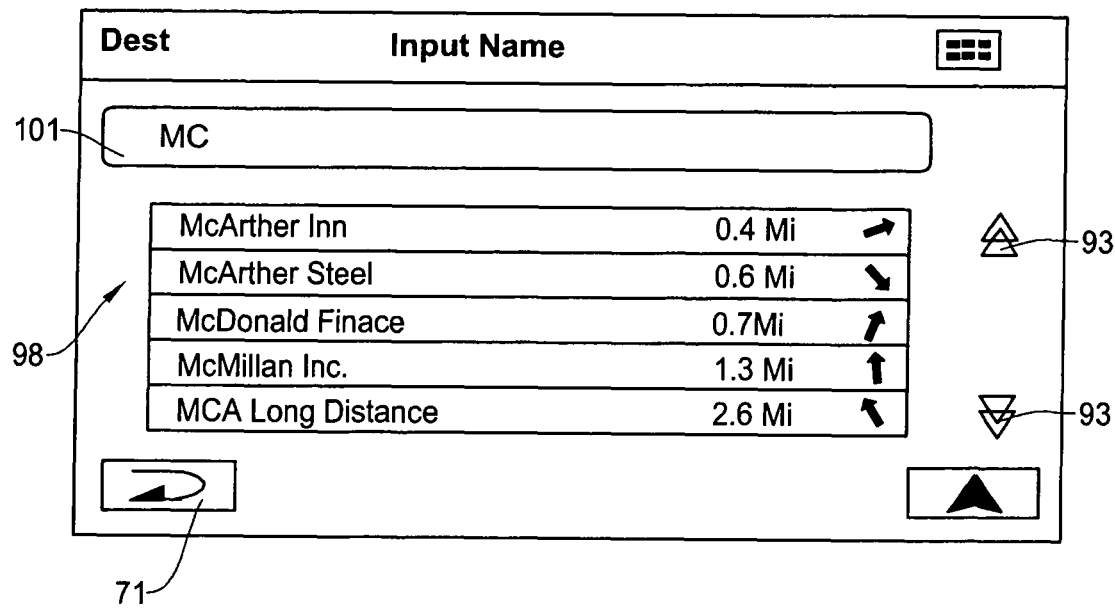
FIG. 3D shows a display example of the navigation system of the present invention which is listing POIs when there is no brand icons associated with the input characters.

FIG. 3D shows a display example of the navigation system of the present invention which is listing POIs when there is no brand icons associated with the input characters. When none of the POI names having the characters input so far by the user have brand icons, the navigation system shows a list of POI names that match the input characters in the conventional manner. Such a list shows the POI names in the order of distance or alphabet when the user presses a list key or an enter key (not shown).

Figure 4A:
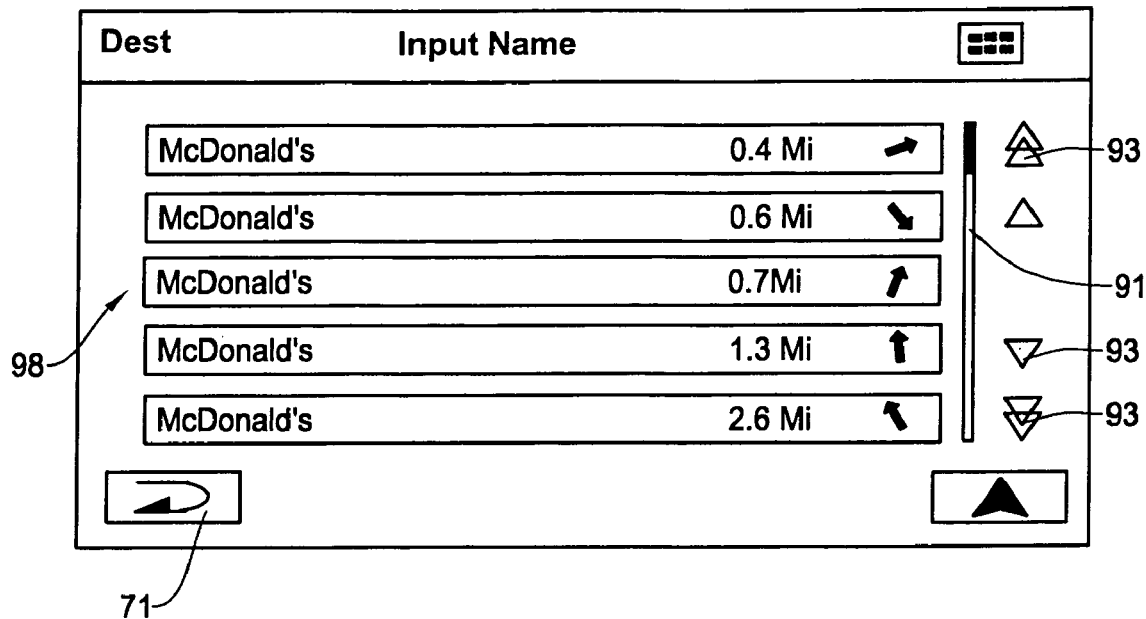
FIG. 4A is a schematic diagram showing a display example, after the user has selected a brand icon in the previous step, where a plurality of matching POIs are listed to prompt the user to select one of them.

When the user selects the desired brand icon in FIG. 3C, the navigation system shows a list 98 of the specific POIs of the selected brand icon as shown in FIG. 4A to prompt the user to select one of the matching entries. In this example, five "McDonald" stores are listed and sorted by distance from the current (user, vehicle) position. The arrows are shown at the right of the each entry to indicate an approximate direction to each store. Moreover, an approximate distance from the current location is also listed for each store.

The user can select one of the entries from the list 98 to select the destination. Scroll keys 93 may be provided as shown for scrolling the list of matching entries "McDonald" in the case not all of the matching entries can be displayed on the same screen. In this display, by pressing the scroll button 93 for scrolling up and down the list, more matching entries can be displayed. The scroll indicator 91 indicates the position of the entries relative to the entire list.

Figure 4B:
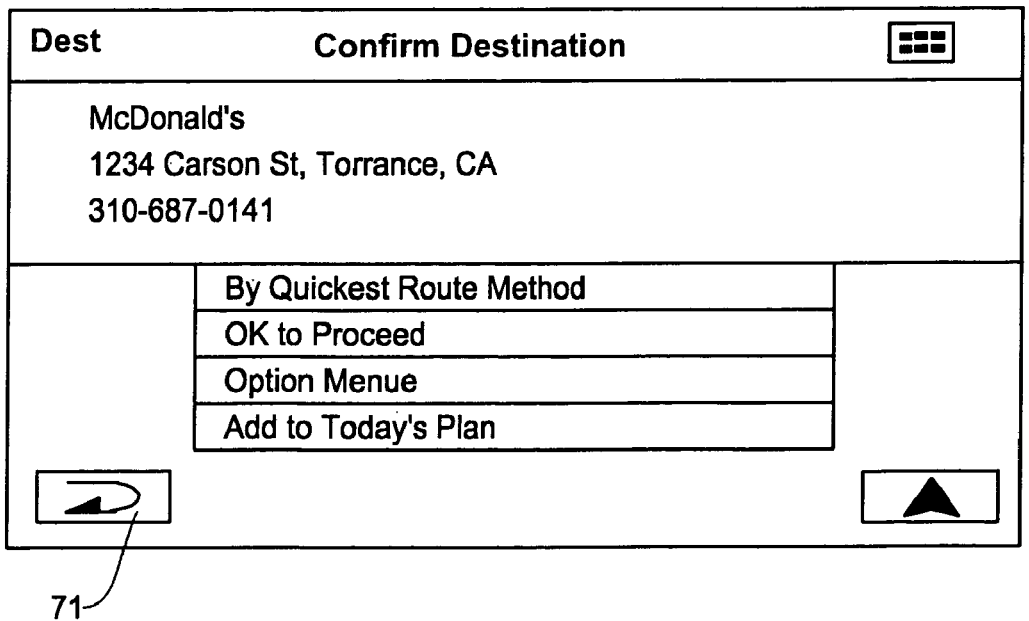
FIG. 4B is a schematic diagram showing a display example, after the user has selected one of POIs for confirming the destination.

When selecting one of the stores of "McDonald", the navigation system shows more detailed information of the selected store, such as an address, telephone number, etc., as shown in FIG. 4B to prompt the user to confirm the destination. When the user selects an "OK to Proceed" menu in FIG. 4B, the navigation system calculates an efficient route to the selected destination as shown in FIG. 1G. Then, the navigation system starts the route guidance operation as shown in FIG. 1H. In the case where only one location for the selected brand icon exists within a predetermined distance range from the current vehicle location, the navigation system may skip the display shown in FIG. 4A and immediately show the screen of FIG. 4B for confirming the destination.

Figure 5:
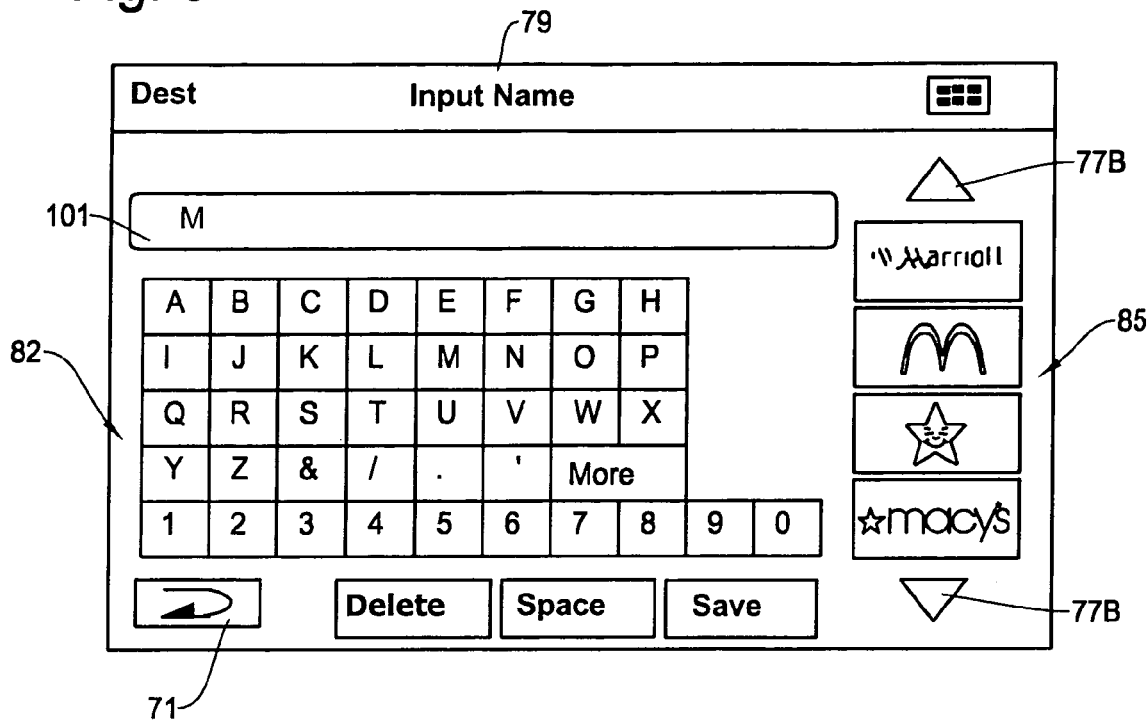
FIG. 5 is a schematic diagram showing another example of display corresponding to that of FIGS. 3A-3C where a brand icon area is provided at the side of the screen.

FIG. 5 is a schematic diagram showing another example of monitor screen corresponding to that of FIGS. 3A-3C where a list of brand icons is provided at an area 85 which is located at the side of the screen. Further, the keys on a keyboard 82 are arranged in an alphabetical order. By pressing the scroll arrow 77B, the list of brand icons will be scrolled either from up to down or down to up to move the brand icons. The display screen for inputting and selecting a POI is not limited to the foregoing examples and may take various other arrangements to accept user's input and display matching brand icons.

Figure 6:
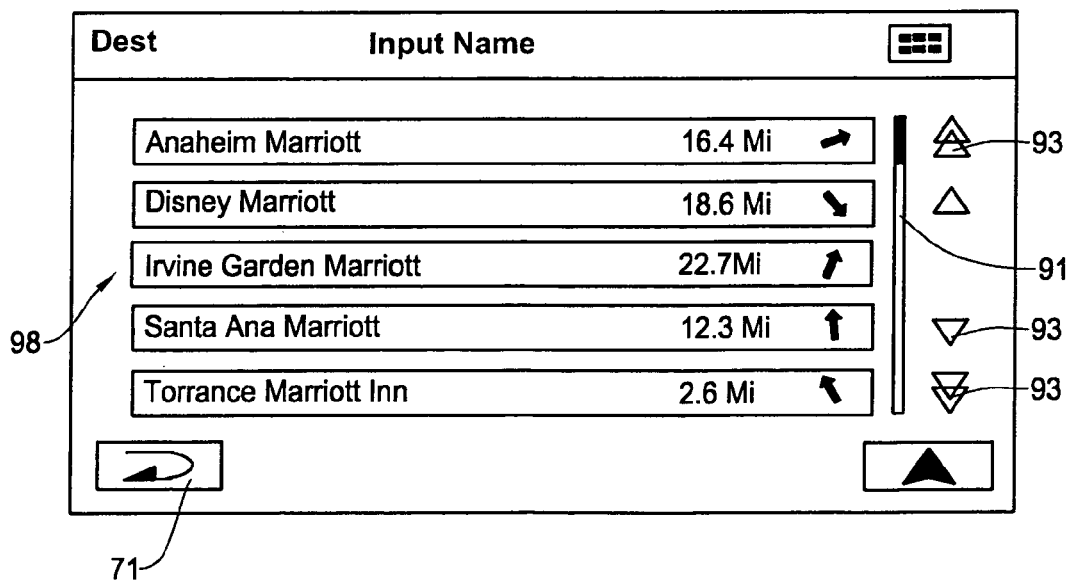
FIG. 6 is a schematic diagram showing another display example, after the user has selected a brand icon in the previous step, where a plurality of matching POIs are listed to prompt the user to select one of them.

FIG. 6 is a schematic diagram showing another example of monitor screen corresponding to that of FIG. 4A that lists the POIs when one of the brand icons is selected in the example of FIG. 3B or 5. This example shows the case where the POIs are listed by the alphabetical order of the POI names rather than the order of distance. In this example, POIs having a name "Marriott" also have supplemental characters such as city names, etc., thus, the navigation system lists the POIs in the alphabetical order. By pressing the scroll arrow 93, the list of POI names will be scrolled.

Figure 7:
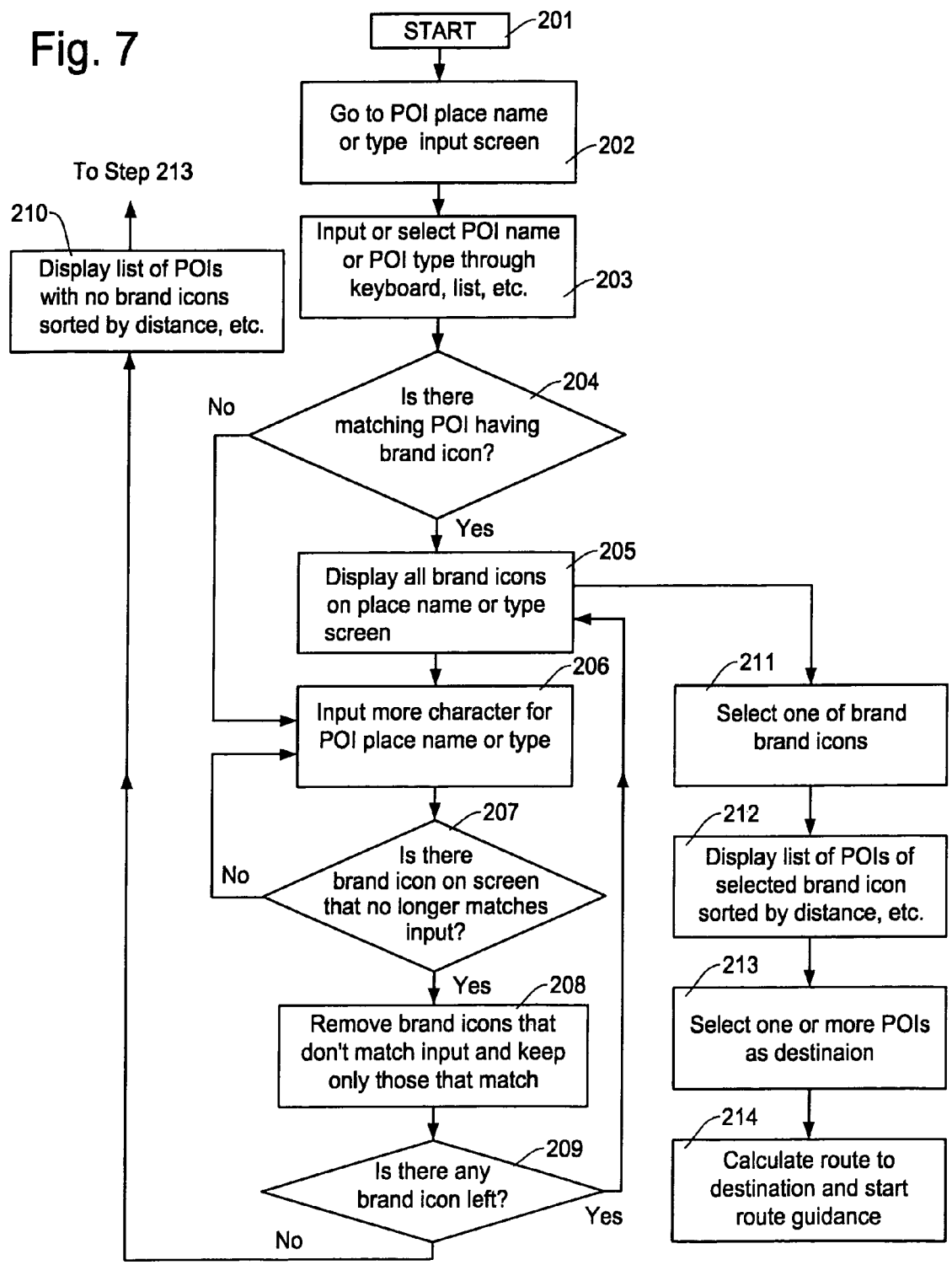
FIG. 7 is a flow chart showing an example of basic operational process for selecting a POI as a destination by incorporating brand icons under the present invention.

FIG. 7 is a flow chart showing an example of basic operational process for selecting a POI by incorporating brand icons under the present invention. In the step 201, the process of the present invention starts for selecting a destination. In the next step 202, the user sets the navigation system to the screen for inputting a POI place name. As noted above, the POI "Place Name" input screen is a screen such as shown in FIGS. 3A-3C or FIG. 5 which is displayed when the user selects a "Place Name" in FIG. 1D for finding a POI.

As will be described with reference to FIGS. 10A-10E, it is also possible to set the navigation system to the screen for inputting a POI type or category or selecting a POI type from a list. As shown in FIG. 10C-10E, the POI category input screen is a screen which is displayed when the user wants to specify the POI category by selecting desired POI type from a list or inputting the characters of the desired POI type. The following description will be made for the case where the user specify the desired POI name.

In the step 203, the user can specify the POI place name through the keyboard on the screen shown in the foregoing examples or by a separate input device such as a remote controller. As the user inputs one or more characters, the navigation system will check the POI database to determine if the string of characters has a relevant (matching) POI name with associated brand icon in the step 204. As noted above, during this process, the navigation system checks the database and causes some keys on the keyboard 81 be shaded and disabled when the characters of the those keys cannot follow the user's input.

Alternatively, it is also possible that the navigation system begins the process by showing all of the brand icons on the screen even though no input has been made by the user. Then, the user checks the brand icons on the screen and selects desired one or more of the brand icons. This method is useful when the total number of brand icons registered in the navigation system is relatively small.

In the step 204, if the brand icon exists, the navigation system displays all matching brand icons in the brand icon area 85 on the screen at the step 205. The brand icons may be listed in the manner shown in FIGS. 3B-3C and 5. If the matching brand icons are too numerous to be shown on a single screen, the scroll button such as shown in FIG. 3B may be provided so that the user can scroll the list to view the brand icons that have not been visible previously.

If the user wants to further narrow down the candidate POI names, the user continuously inputs additional characters in the input field at the step 206. In response, in the step 207, the navigation system will check if there is a POI name that matches the input as a result of additional characters. When there is a matching POI which is associated with a brand icon, the navigation system displays the brand icon in the assigned area 85 of the screen.

If the brand icons no longer match the input characters, the navigation system will remove the brand icons from the screen in the step 208. As the user inputs more characters, the navigation system is able to narrow down candidate brand icons. In the step 209, the navigation system will check whether there is any brand icon left. If at least one brand icon that matches the user's input exits, the navigation system will keep displaying all of the matching the brand icons and monitoring the user's next input. If there is no matching brand icon, the navigation system will not display any brand icons in the step 210, although navigation system continues the process of searching the POI names that match the characters specified in the input field.

In the step 205 noted above, the navigation system can accept the user's selection of a particular brand icon from the list of brand icons. Since typical examples of such POIs having brand icons are retail chains having a large number of chain stores or franchise stores, the navigation system can retrieve the POIs associated with such brand icons. Thus, when the user selects one of the brand icons in the list in the step 211, the navigation system will retrieve data regarding the POI names having the selected brand icon and display a list of POI names in the step 212.

For instance, the navigation system may list McDonald's chains when the McDonald's icon such as shown in FIG. 4A is selected by the user. The POIs names may be listed in the order of distance from the current position of the user as shown in FIG. 4A. Alternatively, the POI names can be sorted by other criteria, such as an alphabetical order of attached location names as shown in FIG. 6.

When selecting one of the POIs in step 213, the navigation system shows more detailed information of the selected store, such as an address, telephone number, etc. as shown in FIG. 4B. When the user confirms the destination by selecting the "OK to Proceed" menu, the navigation system calculates an efficient route to the selected destination in step 214 and starts the route guidance to the destination.

FIGS. 8 and 9 show the effect of the present invention in which the number of key strokes until reaching a desired POI is significantly reduced compared to the conventional technology. FIG. 8 shows a table in which the number of input and the maximum and average numbers of brand names available corresponding to the input are listed based on navigation map data provided by Zenrin (Oita, Japan). FIG. 9 shows a table in which the numbers of input required for attaining desired POIs are compared between the present invention and the conventional method.

As exemplified by the tables of FIGS. 8 and 9, the inventors of the present invention have determined that the present invention has the advantage for narrowing down the candidate brand icons with a small number of user's input (key strokes). For example, as shown in the table of FIG. 8, when only one character is input, from a list of 265 POI brand names, an average of 10.52 brand icons would be available with the maximum of 30 brand icons. After 2 inputs, the average number of brand icons would be down to 2.10 with the maximum of 7 brand icons. Likewise, after 3 inputs, the average number of brand icons would be down to 1.23 with the maximum of 3 brand icons. Thus, in most cases, the user only needs to input up to 3 characters (key strokes) to find a brand icon on the display.

The table in FIG. 9 shows the relationship between the system having the present method for a brand icon and the conventional system. The table shows the place names having brand icons taken for various place names from the list of brand icons arranged alphabetically. The number of inputs with the conventional system column denotes the number of key strokes necessary to select the POI listed in the brand icon column. The number of inputs with the new system denotes the number of key strokes necessary for the present invention to select the POI utilizing the brand icon.

For example, for the case of "Bass Pro Shops" eleven key inputs are necessary in order to find "Bass Pro Shops" in the conventional method. On the other hand, only one key input is necessary for the navigation system to display the brand icon for Bass Prop Shops under the present input method. Likewise, for the case of "Nordstrom's", nine key inputs are necessary in order to find "Nordstrom's" in the conventional method, but one key input is necessary for the navigation system to display the brand icon for "Nordstrom's" in the new input method. In average, the number of inputs for the conventional method is 9.4 while it would be only 1.6 under the present invention. Thus, significant reduction of time and effort can be achieved under the present invention.

The brand icons are generally provided by the map data provider for chain stores with high recognition. It is also possible to assign brand icons to particular chain stores as needed by a manufacturer of navigation systems. For instance, the brand icon may be updated when new franchise stores are created. Even if the chain stores are relatively minor local franchise, the user may assign a brand icon to the chain stores if desired.

The method to input a POI under the present invention described above shows the case where the user input a place name of a POI name through a keyboard. However, the method of inputting the POI using the brand icons under the present invention is applicable to cases other than the situations described above. FIGS. 10A-10F are display examples where the user selects a particular POI by category. Such POI category may be selected from a list of POI category or inputting characters of POI category.

Figure 10A:
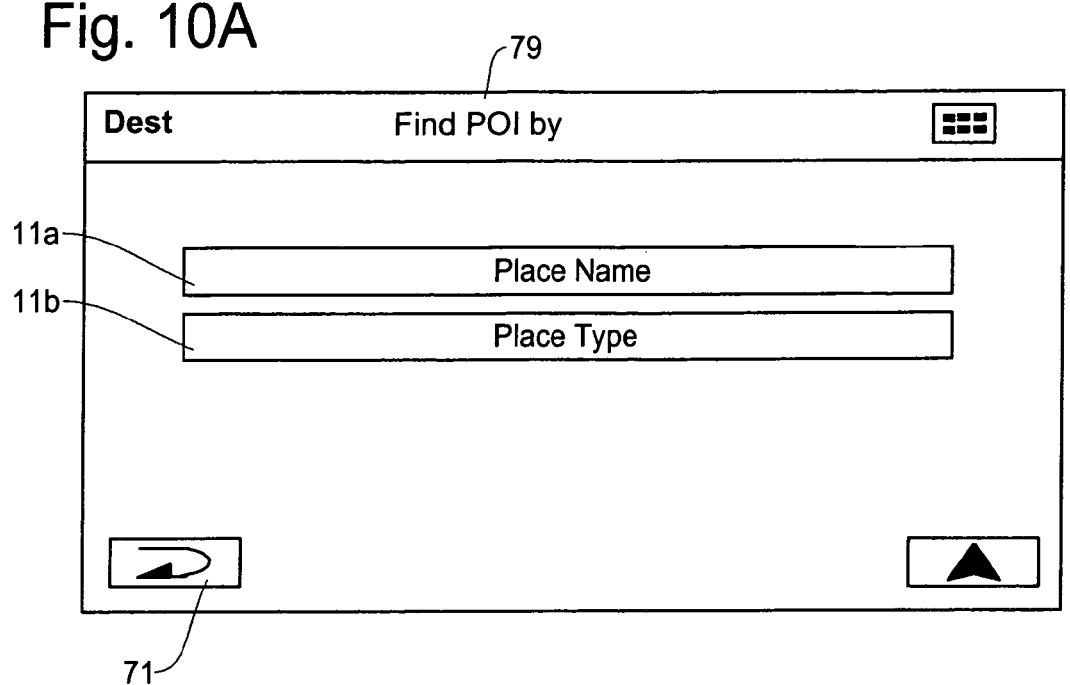
FIGS. 10A-10F are schematic diagrams showing examples of screen displays of the navigation system under the present invention to show the steps of selecting a particular POI by inputting a category of POI.

FIG. 10A is a display example where the user is able to select a method of finding a desired POI, which typically comes after selecting a Point of Interest (POI) in the "Find Destination by" screen of FIG. 1C. The screen 79 of FIG. 10A shows a place name button 11a and a place type button 11b on the screen. The place name button 11a allows the user to input a name of a POI as described above.

Figure 10B:
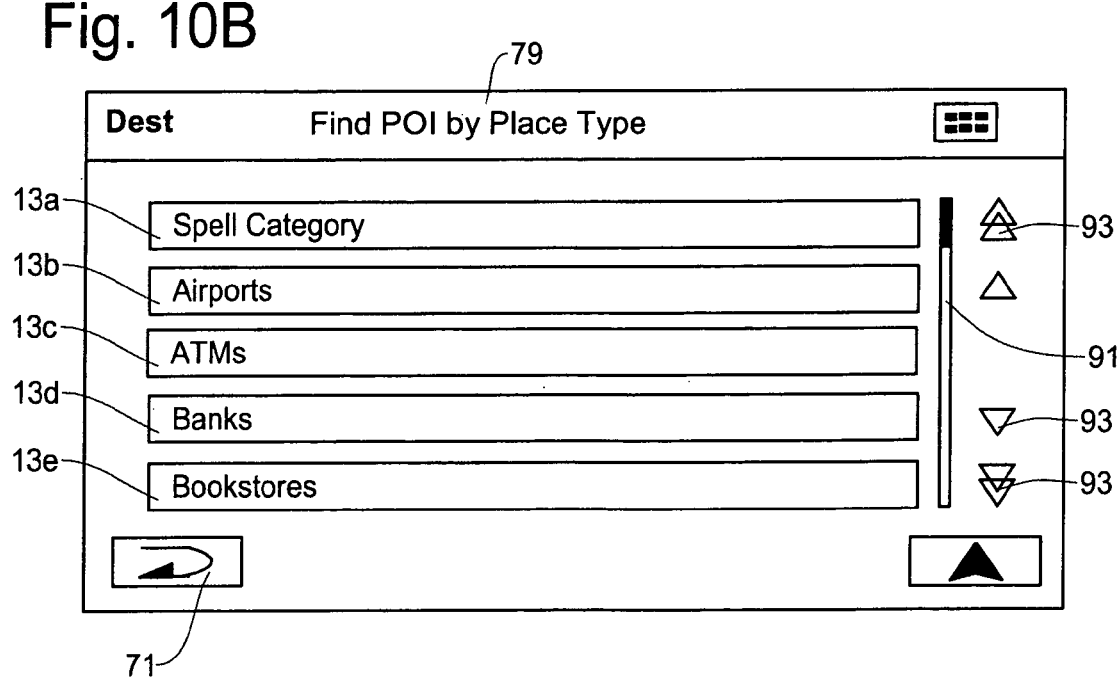
Figure 10C:
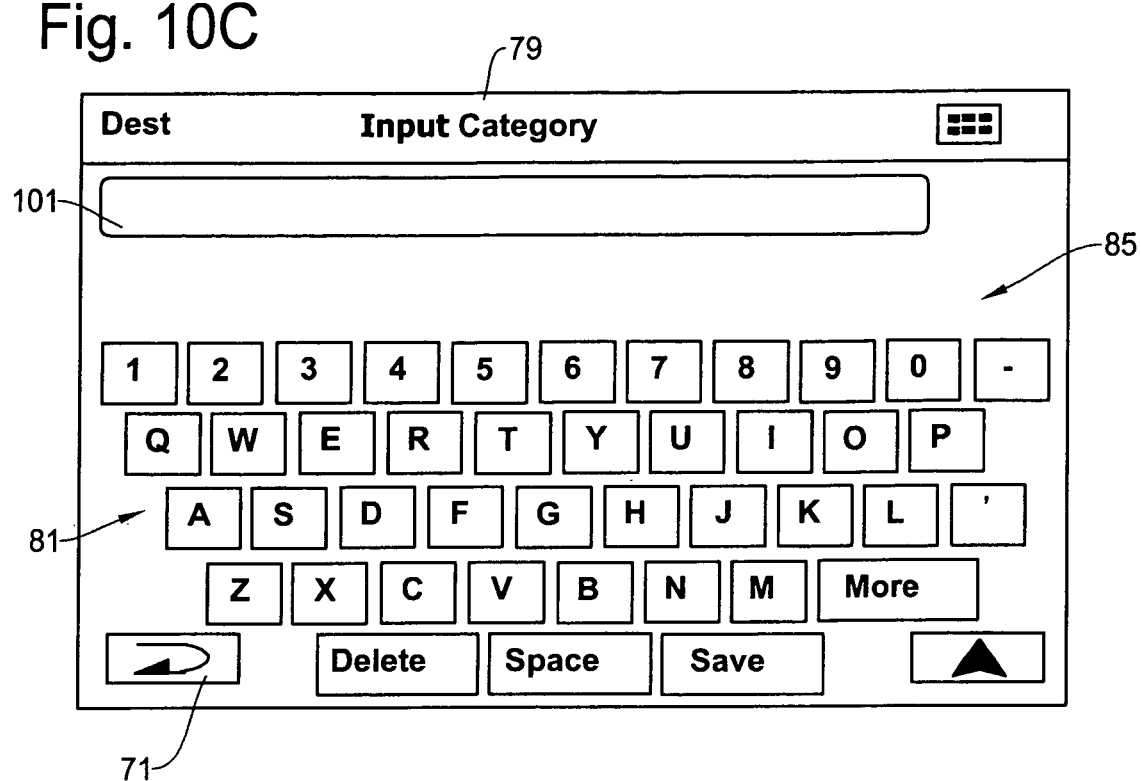
Figure 10D:
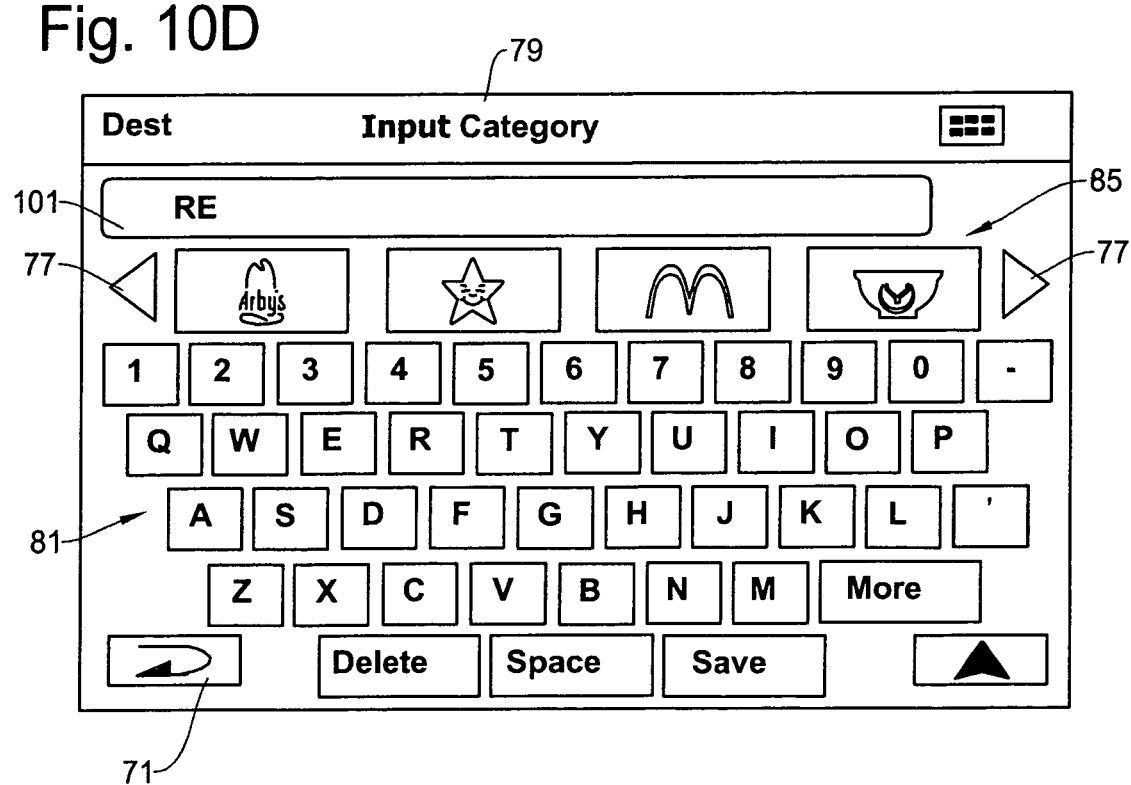
Figure 10E:
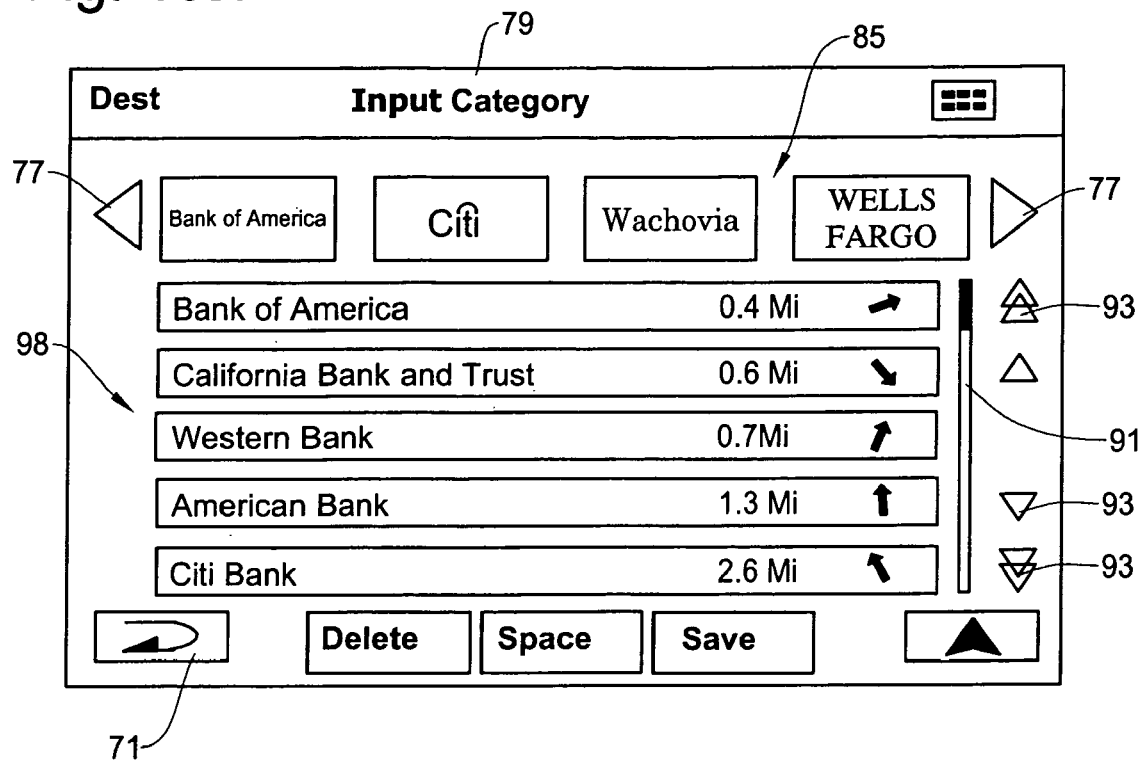
Figure 10F:
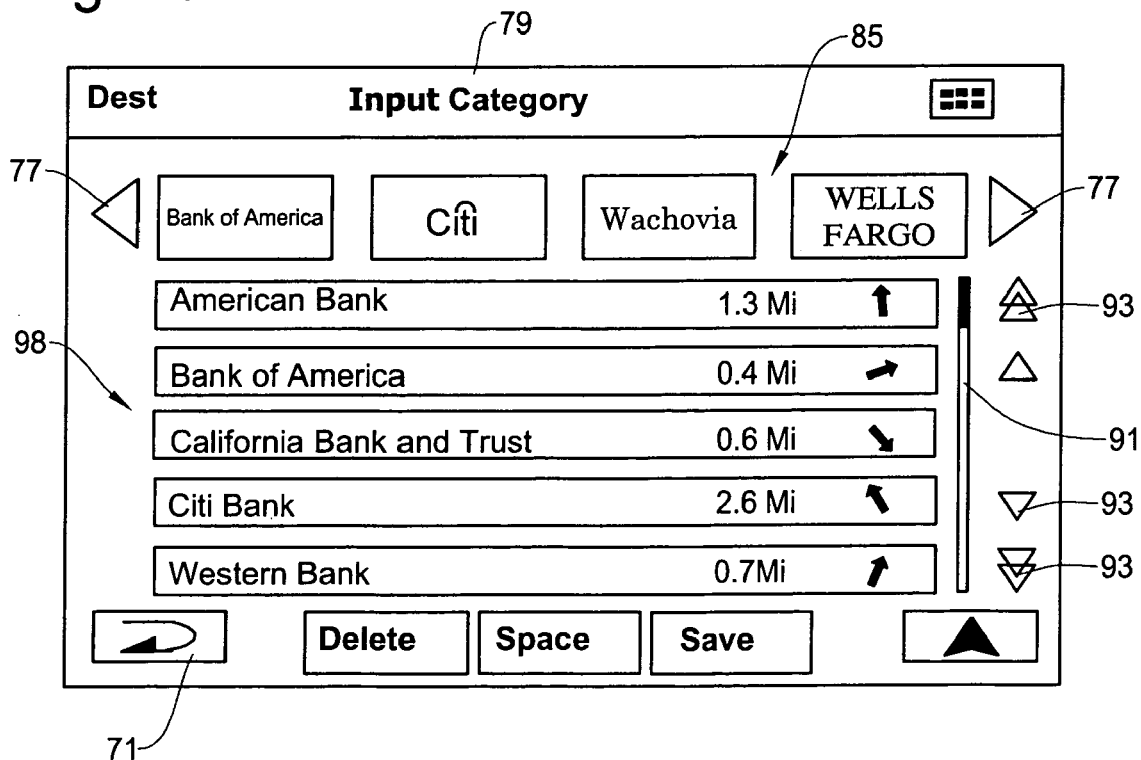

When the user selects the place type button 11b, the navigation system will show the screen 79 of FIG. 10B. Through this screen, the user is able to select a particular category such as airport, ATM, bank and book store, etc. from the list. Alternatively, the spell category button 13a can be used to manually input the name of a category. When the user selects the spell category button 13a, the navigation system will show the display in FIG. 10C, which accepts the name of POI category through operation of keyboard. This display is similar to the display shown in FIG. 3A, except that the user is prompted to enter a name of a category (place type) rather than a place name.

As the user inputs the category name into the input field 101, the navigation system will check whether any brand icon would match the user's input. For instance, if the user has input "RE" as shown in FIG. 10D, the navigation system may determine that "rest area" and "restaurant" categories are relevant to the user's input. In this case, the navigation system will search brand icons that fall into the "Restaurant" category. Thus, the navigation system lists all relevant brand icons for the POI type "Restaurant". The user is able to scroll the list by pressing the scroll button 77 to see more entries concerning the POI type.

In addition to "Spell category" button 13a, the display example of FIG. 10B shows a list of POI types which shows "Airports" "ATMs", "Banks", and "Bookstores" at buttons 13a-13e, respectively. FIG. 10E is a display that is shown when the user has selected the POI type "Banks" from the list by pressing the button 13d in FIG. 10B. Consequently, the screens of FIGS. 10E and 10F list the names of bank in the list 98 and also brand icons for banks in the brand icon area 85. The names of the bank are listed in the order of distance from the current position in FIG. 10E and in the alphabetical order in FIG. 10F. The user is able to scroll the names of the bank and the brand icons for the bank with use of the scroll keys 93 and 77.

Figure 11:
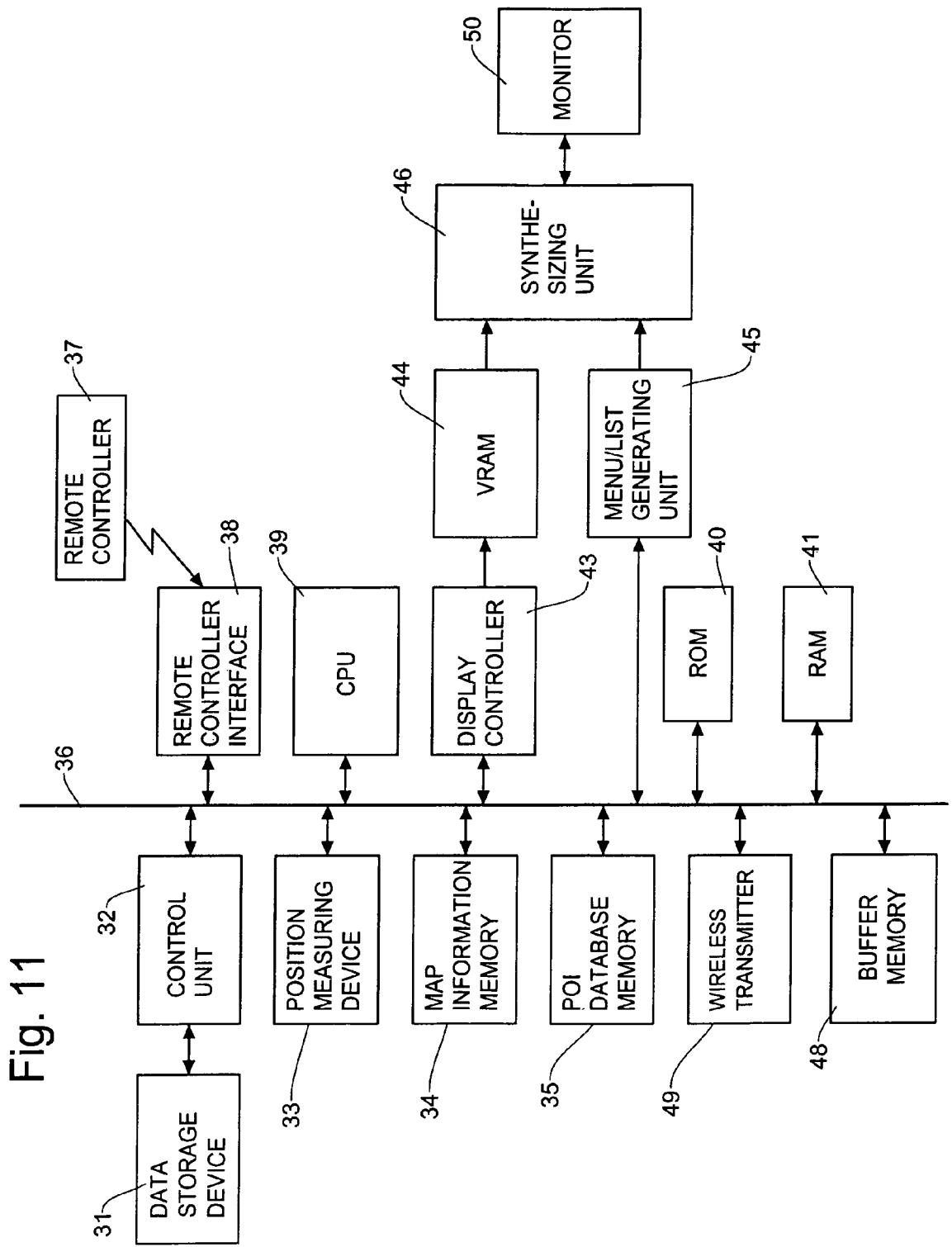
FIG. 11 is a block diagram showing an example of configuration of a vehicle navigation system implementing the present invention.

FIG. 11 shows an embodiment of the structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage device 31 such as a hard disc, CD-ROM, DVD or other storage means for storing the map data. The brand icons and the look-up table are also stored in the data storage device 31. The navigation system includes a control unit 32 for controlling an operation for reading the information from the data storage medium 31, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (global positioning system) receiver, and etc.

The block diagram of FIG. 11 further includes a map information memory 34 for storing the map information which is read from the data storage device 31, a database memory 35 for storing database information such as point of interest (POI) information which is read out from the data storage device 31, a remote controller 37 for executing a menu selection operation, an enlarge/reduce operation, a destination input operation, etc. and a remote controller interface 38. Although a remote controller is a typical example for selecting menus, executing selected functions and etc., the navigation system includes various other input methods to achieve the same and similar operations done through the remote controller.

In FIG. 11, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating map image (a map guide image and an arrow guide image) on the basis of the map information, a VRAM 44 for storing images generated by the display controller 43, a menu/list generating unit 45 for generating menu/various list images, a synthesizing unit 46, a wireless transmitter 49 for wireless communication to retrieve data from a remote server, a buffer memory 48 for temporally storing data for ease of data processing, and a monitor (display) 50.

In the configuration described above, the data storage device 31 stores the brand icons and look-up tables to correlate locations with the brand icons in the brand icon database. However, a separate storage medium may be provided solely for the purpose of storing the brand icons and the look-up tables. The wireless transmitter 49 may have a functionality of retrieving updated data regarding brand icons in addition to other traffic incident information, etc. The CPU 39 controls the overall operation of the navigation system including the procedure of the present invention for finding a POI by incorporating brand icons.

As has been described above, according to the present invention, when the user inputs characters indicating a POI name or a POI type, or selecting a POI type from a list, the navigation system displays brand icons of the POI name or POI type. When the user selects one of the brand icons, the navigation system lists the POIs associated with the brand icons in the predetermined order such as distance from the current position. Since the number of brand icons are limited, and each brand icon has a readily recognizable image, the user can quickly find a desired POI by selecting a brand icon.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for selecting a point of interest (POI) for a navigation system, comprising the following steps of:
   inputting one or more characters indicating a place name of an intended POI for a navigation system through an input screen;
   detecting whether place names specified by the characters input so far have matching brand icons;
   displaying the detected brand icons of the place names specified by the input characters on the input screen as soon as one or more characters are input;
   repeating the above steps as desired;
   selecting one of the detected brand icons;
   displaying a list of POI names having the selected brand icon; and
   selecting a POI from the list of POI names.

2. A method for selecting a POI as defined in claim 1, further comprising a step of calculating a route to the selected POI and conducting a route guidance operation to the selected POI.

3. A method for selecting a POI as defined in claim 1, wherein said step of displaying the list of POI names having the selected brand icon includes a step of listing the POI names in an order of distance from a current position to the POIs.

4. A method for selecting a POI as defined in claim 1, wherein said step of displaying the list of POI names having the selected brand icon includes a step of listing the POI names in an alphabetical order of the POI names.

5. A method for selecting a POI as defined in claim 1, wherein said step of detecting whether the place names specified by the characters input have brand icons includes a step of listing POI names that match the input characters without displaying brand icons if the place names do not have brand icons.

6. A method for selecting a point of interest (POI) for a navigation system, comprising the following steps of:
   inputting one or more characters indicating a place type of an intended POI or selecting a place type of the intended POI from a list on a screen of the navigation system through an input screen;
   detecting whether POIs of the place types specified by the user so far has matching brand icons;
   displaying the detected brand icons of POIs belonging to the specified place types on the input screen as soon as one or more characters are input;
   repeating the above steps as desired;
   selecting a brand icon from a list of the detected brand icons;
   displaying a list of POIs belonging to the place type of the selected brand icon; and
   selecting a POI from the list of POIs.

7. A method for selecting a POI as defined in claim 6, further comprising a step of calculating a route to the selected POI and conducting a route guidance operation to the selected POI.

8. A method for selecting a POI as defined in claim 6, wherein said step of displaying the detected brand icons of the specified place type includes a step of listing the POIs in an order of distance from a current position to the POIs.

9. A method for selecting a POI as defined in claim 6, wherein said step of displaying the list of POIs of the specified place type includes a step of listing the POIs in an alphabetical order of the POI.

10. A method for selecting a POI as defined in claim 6, wherein said step of displaying the list of POIs of the specified place type includes a step of scrolling the screen of the navigation screen to see remaining brand icons.

11. An apparatus for selecting a point of interest (POI) for a navigation system, comprising:
    means for inputting one or more characters indicating a place name of an intended POI for a navigation system through an input screen;
    means for detecting whether place names specified by the characters input so far have matching brand icons;
    means for displaying the detected brand icons of the place names specified by the input characters on the input screen as soon as one or more characters are input;
    means for repeating the above steps as desired;
    means for selecting one of the detected brand icons;
    means for displaying a list of POI names having the selected brand icon; and
    means for selecting a POI from the list of POI names.

12. An apparatus for selecting a POI as defined in claim 11, further comprising means for calculating a route to the selected POI and conducting a route guidance operation to the selected POI.

13. An apparatus for selecting a POI as defined in claim 11, wherein said means for displaying the list of POI names having the selected brand icon includes means for listing the POI names in an order of distance from a current position to the POIs.

14. An apparatus for selecting a POI as defined in claim 11, wherein said means for displaying the list of POI names having the selected brand icon includes means for listing the POI names in an alphabetical order of the POI names.

15. An apparatus for selecting a POI as defined in claim 11, wherein said means for detecting whether the place names specified by the characters input have brand icons includes means for listing POI names that match the input characters without displaying brand icons if the place names do not have brand icons.

16. An apparatus for selecting a point of interest (POI) for a navigation system, comprising:
    means for inputting one or more characters indicating a place type of an intended POI or selecting a place type of the intended POI from a list on a screen of the navigation system through an input screen;
    means for detecting whether POIs of the place types specified by the user so far has matching brand icons;
    means for displaying the detected brand icons of POIs belonging to the specified place types on the input screen as soon as one or more characters are input;
    means for repeating the above steps as desired;
    means for selecting a brand icon from a list of the detected brand icons;
    means for displaying a list of POIs belonging to the place type of the selected brand icon; and
    means for selecting a POI from the list of POIs.

17. An apparatus for selecting a POI as defined in claim 16, further comprising means for calculating a route to the selected POI and conducting a route guidance operation to the selected POI.

18. An apparatus for selecting a POI as defined in claim 16, wherein said means for displaying the detected brand icons of the specified place type includes means for listing the POIs in an order of distance from a current position to the POIs.

19. An apparatus for selecting a POI as defined in claim 16, wherein said means for displaying the list of POIs of the specified place type includes means for listing the POIs in an alphabetical order of the POI.

20. A method for selecting a POI as defined in claim 16, wherein said means for displaying the list of POIs of the specified place type includes means for scrolling the screen of the navigation screen to see remaining brand icons.

\* \* \* \* \*